(12) United States Patent
Yu et al.

(10) Patent No.: US 11,396,570 B2
(45) Date of Patent: Jul. 26, 2022

(54) URETHANE ACRYLIC HYBRID POLYMER DISPERSION WITH ROBUST DRY/WET ADHESION AND BASECOATS PREPARED THEREFROM

(71) Applicant: SWIMC LLC, Cleveland, OH (US)

(72) Inventors: Zhangqing Yu, Twinsburg, OH (US); Ali Javadi, Bedford Heights, OH (US); Abhijit J Suryawanshi, Cleveland, OH (US); Alexandra K Sinclair, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/273,478

(22) Filed: Feb. 12, 2019

(65) Prior Publication Data

US 2019/0248947 A1 Aug. 15, 2019

Related U.S. Application Data

(60) Provisional application No. 62/629,229, filed on Feb. 12, 2018.

(51) Int. Cl.

| C08G 18/10 | (2006.01) |
|---|---|
| C08G 18/08 | (2006.01) |
| C08G 18/28 | (2006.01) |
| C08G 18/32 | (2006.01) |
| C08G 18/38 | (2006.01) |
| C08G 18/67 | (2006.01) |
| C08G 18/73 | (2006.01) |
| C08G 18/75 | (2006.01) |
| C09D 175/16 | (2006.01) |
| C08G 18/34 | (2006.01) |
| C08F 283/00 | (2006.01) |
| C09D 175/00 | (2006.01) |
| C08G 18/44 | (2006.01) |
| C09D 151/08 | (2006.01) |

(52) U.S. Cl.
CPC ...... *C08F 283/006* (2013.01); *C08G 18/0823* (2013.01); *C08G 18/0828* (2013.01); *C08G 18/0866* (2013.01); *C08G 18/10* (2013.01); *C08G 18/284* (2013.01); *C08G 18/3203* (2013.01); *C08G 18/3221* (2013.01); *C08G 18/3228* (2013.01); *C08G 18/348* (2013.01); *C08G 18/384* (2013.01); *C08G 18/3829* (2013.01); *C08G 18/44* (2013.01); *C08G 18/672* (2013.01); *C08G 18/73* (2013.01); *C08G 18/755* (2013.01); *C08G 18/758* (2013.01); *C09D 151/08* (2013.01); *C09D 175/00* (2013.01); *C09D 175/16* (2013.01); *C08G 2270/00* (2013.01)

(58) Field of Classification Search
CPC ............... C08G 18/10; C08G 18/0823; C08G 18/0828; C08G 18/0866; C08G 18/284; C08G 18/3203; C08G 18/3221; C08G 18/3228; C08G 18/348; C08G 18/3829; C08G 18/384; C08G 18/44; C08G 18/672; C08G 18/73; C08G 18/755; C08G 18/758; C08G 2270/00; C08F 283/006; C09D 151/08; C09D 175/00; C09D 175/16

USPC ...................................................... 524/507
See application file for complete search history.

(56) References Cited

U.S. PATENT DOCUMENTS

| 4,111,877 A | 9/1978 | Dixon et al. |
|---|---|---|
| 4,429,095 A | 1/1984 | Sandri et al. |
| 4,632,957 A | 12/1986 | Welsh et al. |
| 5,496,907 A | 3/1996 | Dochniak |
| 5,739,196 A | 4/1998 | Jenkins et al. |
| 6,649,691 B2 | 11/2003 | Pinschmidt, Jr. et al. |
| 6,765,057 B1 * | 7/2004 | Chirivella ............ C09D 175/04 524/840 |
| 6,852,824 B2 | 2/2005 | Schwarte et al. |
| 2013/0281636 A1 * | 10/2013 | Hartig .................. C09D 175/04 525/440.08 |

FOREIGN PATENT DOCUMENTS

| CN | 104193916 A | 12/2014 |
|---|---|---|
| DE | 4414032 | 10/1995 |
| DE | 10053890 | 5/2002 |

(Continued)

OTHER PUBLICATIONS

Szycher, M., "Waterborne Polyurethanes—14.8.1 Classification—Anionic," Szycher's Handbook of Polyurethanes, 2nd Ed., CRC Press, Tyler & Francis Group, pp. 432-433. (Year: 2013).*
PCT International Search Report, dated Apr. 24, 2019.
PCT Written Opinion of the International Searching Authority, dated Apr. 24, 2019.
Kukanja, D., et al. "The structure and properties of acrylic-polyurethane hybrid emulsions and comparison with physical blends", Journal of Applied Polymer Science, 2000. 78(1): p. 67-80.

(Continued)

*Primary Examiner* — Josephine L Chang

(57) ABSTRACT

This invention relates to urethane acrylic hybrid polymer dispersion with robust dry/wet adhesion and the basecoats prepared therefrom for automotive applications. In this system, the polyurethane dispersion (PUD) prepolymer is based on a combination of polyols and aliphatic diisocyanates. The acrylic portion is based on (meth)acrylated monomers. A combination of this hybrid polymer dispersion and other resins having defined glass transition temperature ($T_g$) values, organic and/or inorganic rheology modifiers, and different additives including pigment, dispersant, and defoamer are used to prepare waterborne basecoats having modified appearance and performance. The final coatings show excellent dry/wet adhesion to the primer for automotive applications.

8 Claims, 2 Drawing Sheets

(56) References Cited

FOREIGN PATENT DOCUMENTS

| EP | 0994137     | 8/2001 |
|----|-------------|--------|
| EP | 1124871     | 8/2021 |
| JP | 2001011413 A| 1/2001 |
| WO | 200127178   | 4/2001 |
| WO | 2013139019  | 6/2013 |

OTHER PUBLICATIONS

Sebenik, et al. "Comparison of properties of acrylic-polyurethane hybrid emulsions prepared by batch and semibatch processes with monomer emulsion feed", Polymer International, 2003. 52(5): p. 740-748.

Streitberger, et al. "Automotive Paints and Coatings, 2nd Edition" Wiley, Mar. 2008, Chapter 6, Top Coats, pp. 175-210.

* cited by examiner

URETHANE ACRYLIC HYBRID POLYMER DISPERSION WITH ROBUST DRY/WET ADHESION AND BASECOATS PREPARED THEREFROM

This application claims the benefit of U.S. provisional application No. 62/629,229 filed on Feb. 12, 2018, the entirety of which is hereby incorporated by reference.

TECHNICAL FIELD

This disclosure relates to a urethane acrylic hybrid polymer dispersion and the basecoats prepared therefrom with outstanding dry and wet adhesion for automotive refinishing applications.

BACKGROUND

Basecoats bring the final color to the cars. They are applied over the primers and then covered by the clear coats to protect them from the environment. In the last decade, waterborne basecoats have become the main technology for new paint shops. Since their first industrial application in the 1980s, they have generally captured most of the market. In fact, this achievement is driven by their excellent performance and robust properties as well as the environmental benefits.

Waterborne basecoat materials consist of several individual substances, such as polymers, pigments, rheology modifiers, defoamers, etc. The polymers are used as binding material and provide majority of the performance. The additives mostly support the film-forming and application processes, while the role of pigments is to provide the visual requirements of coatings.

A relatively new class of polymeric materials that has attracted much attention in automotive applications is the urethane acrylic hybrid polymers. These polymers are utilized in particular in their dispersion forms for the formulation of automotive top coats. Hybrid binders of these systems can combine the good properties of the polyacrylics, including UV resistance and outstanding management of the hydroxyl content, with those of the polyurethanes, such as good pigment wetting and exceptional mechanical properties.

Physical blends of polyurethane and polyacrylic dispersions frequently show thermodynamic incompatibilities resulting from the decrease in mixing entropy with increasing molecular weight of the polymers. Hence, it is very usual for the dispersions with physical blends to not provide a combination of positive properties. It is important to note that in the case of interpenetrating networks (IPN), these effects can be mitigated through looping different polymer types together. Although no chemical linkages are formed, the interpenetration of different polymer systems results in a decrease in the phase separation, providing better coating properties. However, a chemical link between polymers is needed to achieve the optimal coating properties. The rules corresponding to those for the polyacrylics and polyurethanes are related to the management of critical properties. Moreover, the properties can be managed by the number and location of linkages.

A very wide range of procedures can be used to synthesize such hybrid polyacrylic polyurethane polymers. A common process is the incorporation of compounds, which can enable radical graft reactions, in the polyurethane backbones. For instance, monomers such as thiodiethanol, vinyl cyclohexanediols, trimethylol propane monoallyl ether, and hydroxyalkyl (meth)acrylic have been used. Such polyurethane precursors as the starting points are fed in during the organic phases, producing the desired hybrid polymers via polymerization. Then, the dispersion process is performed and the solvent is removed, resulting in production of solvent-free secondary dispersions.

In another procedure, a polyurethane synthesized in a solvent is dispersed in water, and the hybrid polymer is created in this aqueous phase through a polymerization process. The polymerization takes place in a particle swollen to a lesser or greater extent by the monomers. In general, it is possible to make specific changes to the properties of the hybrid polymer dispersions by varying the process and the ratio of polyurethane to polyacrylic. The batch processes often yield larger particles than those produced by semibatch processes, and the particle size decreases with increasing polyurethane ratio.

The synthesis of light-stable polyurethane dispersions calls for the use of different aliphatic diisocyanates, such as 1,6-hexamethylene diisocyanate (HDI), tetra-methyl xylylene diisocyanate (TMXDI), isophorone diisocyanate (IPDI), or 4,4'-dicyclohexylmethane diisocyanate (commercially available under the trademark Vestanat® H12MDI from Evonik Industries). In addition, the choice of diisocyanates can determine the final viscosity of the corresponding prepolymers or prepolymer solutions. For example, TMXDI produces the lowest viscosity and HDI creates the highest viscosity level because of its symmetrical structure. The drying extent can be controlled by the hydrophobic segments as well as the hydrogen bonds between the polymer chains.

Mechanical tests can be used to measure properties of coatings under simulated lab conditions, which are representatives of conditions a car could encounter throughout its lifetime. Some examples include steam jet, abrasion, and scratch resistance tests. Moreover, simple tests such as pull-off tests, impact tests, and bending tests fall into this classification. The adhesion of coating systems is a critical index to evaluate the coating performance. In fact, if the adhesions fail, other protection mechanisms will be worthless. Cross cut is considered as an empirical test technique for examination of adhesive strength of the coatings. This test method is frequently used because of its simplicity and the fact that it is applicable as a field check.

In water soaking environment or high relative humidity, the coating dry adhesion will change to wet adhesion, which is considered as an important factor of coating degradation. The complexity of de-adhesion process is the main difficulty in the study of wet adhesion. This process is influenced by various uncertain parameters, such as the interfacial electrochemical reactions, transportation of water, the formation of blister, and the surface state of the steel. In addition, these factors may interact with each other and make degradation of wet adhesion more complicated.

Several polymerizable monomers have been proposed for improving wet adhesion of coatings. These materials are mostly based on a polymerizable segment attached to an imidazolidone or other types of urea-based group. In general, (meth)acrylate or (meth)acrylamide segments have been employed to create the polymerizable function for the monomers. In addition, allylic functionalities have been utilized to provide polymerizable functions.

U.S. Pat. No. 4,111,877 discloses developing emulsion polymers suitable for use in coating compositions based on wet adhesion monomers derived from allyl esters of N-alkyl-omega-(alkylene ureido)carbamic acid. The starting material for the synthesis of the wet adhesion monomer was 2-aminoethylethyleneurea which was formed by reaction between diethylenetriamine and urea. Then, the resulting ureido compound was reacted with allyl chloroformate to prepare the allyl carbamate. U.S. Pat. No. 4,632,957 disclosed some acrylic latex coating compositions based on wet adhesion monomers derived from ethylenically unsaturated ethylene and propylene ureas. The wet adhesion monomers were synthesized by reacting a primary alcohol or amine with a monoisocyanate. The typical primary amines were based on imidazolidones. Moreover, the monoisocyanates included isocyanato propyl methacrylate and isocyanatoethyl methacrylate.

U.S. Pat. No. 5,496,907 discloses a new series of wet adhesion monomers containing a ureido group and optionally nitrile functionality. The ureido compound was formed by cyanoethylating an amino alkylene oxyalkylene ethyl urea or an amino alkylethylene urea. Ethylenic unsaturation was imparted by reducing nitrile and reacting the resulting amine with monoisocyanate containing acrylic functionality including isocyanatoethyl methacrylate. Moreover, U.S. Pat. No. 4,429,095 disclosed cyclic alkylene urea compounds having residual unsaturation as wet adhesion promoters in latex coatings. In order to produce wet adhesion monomers, a mono- or bis-(alkylene ureido alkyl)urea was reacted with an unsaturated glycidyl ether.

U.S. Pat. No. 5,739,196 discloses latex compositions containing wet adhesion promoting monomers. Such monomers possessed acrylic functionality as polymerizable unit and dimethylaminopropyl, N-(2-methacryloxyethyl)ethylene urea, or 2-N-morpholinoethyl as active functionalities. U.S. Pat. No. 6,649,691 disclosed the reaction of unsaturated carbonates, including vinyl ethylene carbonate, with N-aminoethylimidazolidone under mild conditions to create a mixture of vinyl and hydroxy functional imidazolidone carbamates. These systems could readily polymerize into vinyl or acrylate acetate based emulsion polymers, showing improved wet adhesion.

SUMMARY

The present invention relates to an improved urethane acrylic hybrid polymer dispersion, comprising:

a. a polyurethane dispersion prepolymer comprising (a) at least one diol selected from the group consisting of a polycarbonate diol and a polyester diol; and (b) at least one diisocyanate selected from an aliphatic dioscyanate or cycloaliphatic diisocyanate; and (c) at least one hydroxyl functional carboxylic acid; and (d) optionally one low-molecular-weight polyol.

b. an acrylic part comprising at least one monomer having polymerizable functionality selected from the group consisting of a (meth)acrylate, allyl, and (meth)acrylamide, wherein said monomer contains at least one pendant functional group selected from the group consisting of ureido, amino, morpholino, phosphate, and any combination thereof, and wherein the acrylic part has a glass transition temperature ($T_g$) in the range of −20° C. to 60° C.; preferably −10° C. to 40° C.; and wherein the acrylic polymer is present in the range of 10 to 90 wt. % based on total hybrid dispersion, preferably from 25 to 75 wt. %.

DETAILED DESCRIPTION

Figure 1:
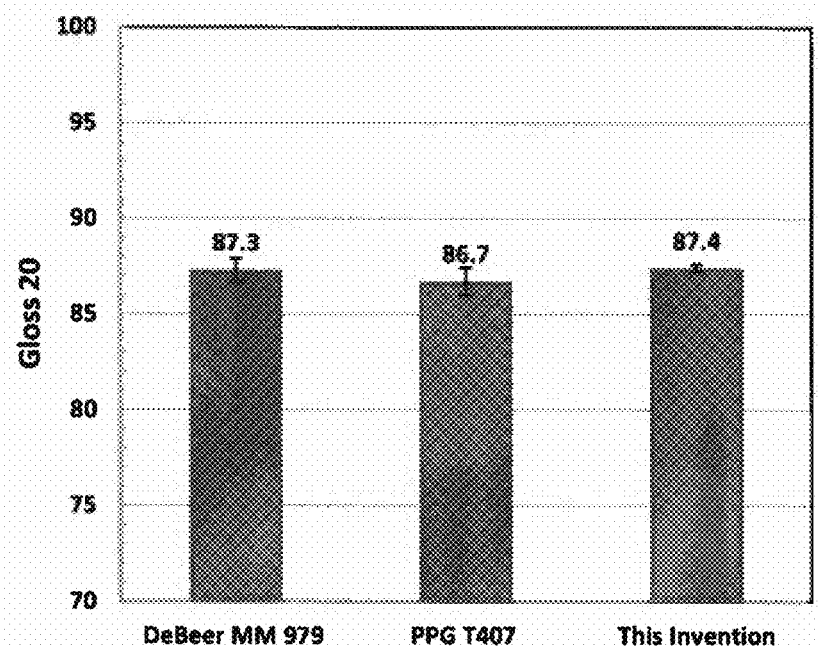
FIG. 1. The gloss 20° values for the following waterborne basecoats tested: DeBeer MM 979 Basecoat Super Jet Black, PPG T407 Envirobase basecoat Jet Black, and this invention. As shown, the values are comparable with each other.

It has now been found that superior wet and dry adhesion can be obtained by forming a urethane acrylic hybrid polymer dispersion of a combination of a polyurethane dispersion prepolymer, and an acrylic part comprising at least one monomer having polymerizable functionality selected from the group consisting of a (meth)acrylate, allyl, (meth)acryamide, wherein said monomer contains at least one pendant functional group selected from the group consisting of ureido, amino, morpholino, phosphate, and any combination thereof.

The polyisocyanate used in making the urethane prepolymer may be an aliphatic or cycloaliphatic polyisocyanate. In one embodiment, the polyisocyanate is an aliphatic polyisocyanate. Specific examples of suitable aliphatic polyisocyanates include alpha.omega-alkylene diisocycantes having 5-20 carbon atoms, such as 1,6-hexamethylene diisocyanate (HDI), 1,12-dodecane diisocyanate, 2,2,4-trimethylhexamethylene diisocyanate, 2-methyl-1,5-pentamethylene diisocyanate, and the like. Preferred aliphatic polyisocyanates include HDI or tetra-methyl xylylene diisocyanate (TMXDI).

In another embodiment, the polyisocyanate is a cycloaliphatic polyisocyanate. Specific examples of suitable cycloaliphatic polyisocyanates include dicyclohexylmethane diisocyanate (commercially available as Desmodur® W from Bayer Corporation), isophorone diisocyanate (IPDI), 1,4-cyclohexane diisocyanate, 1,3-bis-(isocyantomethyl)cyclohexane, and the like. Preferred cycloaliphatic polyisocyanates include dicyclohexylmethane diisocyanate and isophorone diisocyanate.

Conventionally, polyurethanes are formed by reacting one or more of a polyester polyol, polyether polyol, polycarbonate polyol, polylactone polyol, or polyacrylic polyol with a polyisocyanate in a molar ratio sufficient to ensure that the resulting intermediate product has terminal isocyanate groups, which may subsequently be reacted with a compound which has a group that is reactive with the isocyanate groups and has at least one group that is capable of forming an anion. This group may be subsequently neutralized with a tertiary amine to form a water dispersible polyurethane and the resulting polyurethane may then be chain extended in water with a diamine by reaction of the diamine with unreacted isocyanate groups of the polyurethane.

Particularly useful polyurethanes according to the present invention derive from a monomer blend comprising polyester polyols and polycarbonate polyols reacted with one or more polyisocyanates to form an isocyanate terminated product.

The polyester polyols typically are esterification products prepared by the reaction of organic polycarboxylic acids or their anhydrides with a stoichiometric excess of a diol or diols. Examples of suitable polyols for use in the reaction include poly(glycol adipates), poly(ethylene terephthalate) polyols, polycaprolactone polyols, alkyd polyols, and the like and mixtures thereof.

Polycarbonate polyols include those containing the —O—C(=O)—O— group. They can be obtained, for example, from the reaction of (a) diols such as 1,3-propanediol, 1,4-butanediol, 1,6-hexanediol, diethylene glycol, triethylene glycol, tetraethylene glycol and the like, and mixtures thereof with (b) diarylcarbonates such as diphenylcarbonate or phosgene. Aliphatic and cycloaliphatic polycarbonate polyols can also be used. Commercial examples of polycarbonate diols include ETERNACOLL PH100 or PH200 (by UBE Corp.) or RAVECARB 103 or 107 (by Caffaro Industrie, S.p.A.) or DURANOL T5651 or T5652 (by Asahi Kasei).

The polyurethane dispersion prepolymer may optionally include one low-molecular-weight polyol. The low-molecular-weight polyols used to synthesize the polyurethane dispersions generally bring about a stiffening and/or a branching of the polymer chain. The molecular weight is preferably between 60 and 200. Suitable polyols can contain aliphatic, alicyclic or aromatic groups. The low-molecular-weight polyols having up to about 10 carbon atoms per molecule, such as for example ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,5-pentanediol, 1,6-hexanediol, neopentyl glycol, as well as trimethylolpropane, trimethylolethane, glycerol or pentaerythritol and mixtures thereof and optionally also further low-molecular-weight polyols, are cited here by way of example. 1,4-Butanediol, neopentyl glycol, 1,6-hexanediol, trimethylolpropane or trimethylolethane are preferably used as low-molecular-weight polyols.

In accordance with this invention, the polyurethane acrylic hybrids may be formed by combining the polyurethane dispersion prepolymer, and an acrylic part, thereby extending free (meth)acrylate groups on the polyurethane chain with appropriate ethylenically unsaturated monomers, including (meth)acrylic acid and (meth)acrylate monomers. The ethylenically unsaturated monomers should include at least one monomer having polymerizable functionality selected from the group consisting of (meth)acrylated monomers, allyl monomers, or (meth)acrylamide monomers having at least one pendant functional group selected from the group consisting of ureido, amino, morpholino, and phosphate functionality, or any combination thereof. Said ethylenically unsaturated monomer(s) having polymerizable functionality (that is, the (meth)acrylated, ally, or meth(acrylamide) monomers) is present from 0.2 wt. % to 15 wt. %, and more preferably from 2.5 wt. % to 7.5 wt. %, based on the total monomer weight of the acrylic part. The acrylic part should have a $T_1$ in the range from −20° C. and 60° C., and preferably in the range from −10° C. and 40° C. The acrylic part is present in the hybrid polymer dispersion ranging from 10 wt. % to 90 wt. %, and preferably from 25 wt. % to 75 wt. %, based on the total weight of the hybrid polymer dispersion.

As used herein, the term "(meth)acrylate" denotes both "acrylate" and "methacrylate", the term "(meth)acrylic" denotes both "acrylic" and "methacrylic". Similarly, "(meth)acrylamide" denotes both "acrylamide" and "methacrylamide".

In one embodiment, the (meth)acrylated monomer of the acrylic part is selected from the group consisting of ureido methacrylate and phosphate ester of polypropylene glycol methacrylate, and 2-N-morpholinoethyl acrylate.

In another embodiment, the (meth)acrylamide monomer of the acrylic part is selected from the group consisting of dimethylaminopropyl methacrylamide and ureidoethyl methacrylamide.

In yet another embodiment, the allyl monomer of the acrylic part is selected from the group consisting of ally ether of substituted ureas, such as 2-imidazolidinone, 1-(2-aminoethyl)-, N,N-bis(2-hydroxy-3-(2-propen-1-yloxy)propyl), and N-(2-hydroxy-3-(2-propen-1-yloxy)propyl) derivatives.

The inventive combination of the polyurethane dispersion prepolymer and acrylic dispersion of this invention can be synthesized based on the following procedure. The polyurethane dispersion (PUD) prepolymer is synthesized using a combination of polycarbonate diol, a hydroxy-functional carboxylic acid such as dimethylolpropionic acid (DMPA), diisocyanate(s), relevant solvent(s), and a catalyst (if needed). These compounds were added to a clean and dry reactor equipped with a condenser, thermometer, nitrogen inlet, and mechanical agitator. The diisocyanate(s) used may be a combination of TMXDI, IPDI, or H12MDI. The reactor is sealed and temperature is increased to 65-95° C. Temperature is held at this range for 2-3 hours. The NCO end groups were tested every 30 min until they reached the theoretical values. The mixture was cooled to 65-75° C. and then dispersed into a dispersion solution containing neutralizing amine with strong vortex in 5-30 min. Subsequently, the chain extender solution is slowly added to the dispersion over 5-30 min and stirred for another 60 min. The pH value is adjusted to 7.5-9.5 with dimethylethanolamine (DMEA) solution.

The synthesized PUD is transferred to a clean reactor. A monomer mixture from methyl methacrylate (MMA), butyl acrylate (BA), ethyl acrylate (EA), 2-ethylhexyl acrylate (2-EHA), butyl methacrylate (BMA), and adhesion promoters such as ureido methacrylate (UMA), a phosphate substituted methacrylated monomer (under the trade name SIPOMER® PAM 200), or dimethylaminopropyl methacrylamide (under the trade name VISIOMER® DMAPMA) were used for the acrylic portion. The (meth)acrylic monomers or monomer emulsion and the initiator were added to the prepolymer dispersion at 60-80° C. and over 2-4 hours. After 30 min, the chaser solution is added over 30-60 min. Then, the temperature is hold constant for another 60 min. After cooling, the pH should be checked and adjusted to 8.0-9.0. The hybrid product is filtered through a 100 micron filter and is tested for solid content, pH, viscosity, density, and particle size values.

In this invention, P30-SpectraPrime® is utilized as a commercial primer to evaluate different basecoats. This primer is a premium quality 2K-urethane primer-surfacer and provides the ultimate in versatility, performance, and productivity. The P30 system provides resistance to film shrinkage, excellent gloss holdout, and easy sanding. It does not need the addition of a flex additive for plastic parts refinishing.

A combination of the present invention and other resins having defined glass transition temperature ($T_g$) values, inorganic and/or organic rheology modifiers at optimized amounts, and different additives such as pigment, dispersant, and defoamer were used to develop waterborne basecoats with modified appearance and performance. In order to compare the results, two commercially available waterborne basecoats, such as DeBeer MM 979 Basecoat Super Jet Black and PPG T407 Envirobase basecoat Jet Black were also sprayed on P30-SpectraPrime® coated panels. The waterborne basecoats developed based on this invention showed significantly better dry and wet adhesions compared to those of the other products tested.

The urethane acrylic hybrid polymer dispersion developed in this invention is utilized for producing different waterborne basecoats in vehicle refinishing. An optimized combination of this resin and other waterborne dispersion resins having specific $T_g$ may be used for final formulations. Different wetting agents and rheology modifiers may be added to the formulations in order to control the precise properties and characteristics of the products. The rheology modifiers may be chosen from a variety of inorganic and organic types. The optimization of ratios of these rheology modifiers can provide consistent metallic orientation for basecoats subjected to different environmental conditions. For comparison, three commercially available waterborne basecoats were utilized.

In order to evaluate the resistance of waterborne basecoats to separation from the P30-SpectraPrime® primer, the ISO 2409 test is used. This test is an international standard which specifies a test technique when a right-angle lattice pattern is cut into a coating. In fact, properties determined by this empirical test method depends on the adhesion of a coating to either the substrate or the preceding coat. With a lack of adhesive strength and flexibility, both in the intermediate layers and at the substrates, the breaking-off and/or detachments of particular fragments in the coatings can occur. Although the so-called single-blade and multi-blade cutting tools are available as cutting tools, single-blade tool is used in this invention due to its better cut quality and higher reproducibility.

For evaluating wet adhesion of these basecoats to primer, GMW14729 test is used. This method is a procedure which describes two options of high humidity testing, including water fog and wet-bottom, which are normally used to evaluate effect of high humidity environments to coatings. Typically, this influence is measured by testing mechanical and physical properties before and after the exposure test. In this invention, fogging humidity exposure is used to evaluate the wet adhesion of the prepared coatings. The apparatus for this test should consist of a fog chamber, a proper water supply conforming to ASTM D1 193 (IV), atomizing nozzles, suitably conditioned compressed air, and provisions for heating chamber and essential means of control (refer to ASTM B117). The test temperature and humidity within the exposure zone were 38° C.±2° C. and ~100% RH, respectively. In this invention, the total exposure duration is 96 hours.

Example 1

Preparation of Urethane Acrylic Hybrid Polymer

This example illustrates the process of preparation of a urethane acrylic hybrid polymer, using the ingredients listed in Table 1.

TABLE 1

| Ingredients | Weight % |
| --- | --- |
| First stage - PUD preparation | |
| PROGLYDE DMM | 4.52 |
| Dimethylol propionic acid | 1.14 |
| Polycarbonate diols | 9.95 |

TABLE 1-continued

| Ingredients | Weight % |
| --- | --- |
| low-molecular-weight diol or triol | 0.06 |
| Aliphatic diisocyanate mixture | 4.26 |
| Dimethylethanolamine | 0.87 |
| Deionized water | 26.79 |
| Ethylenediamine | 0.56 |
| Deionized water | 2.24 |
| Theoretical end NCO | 3.66% |
| Second stage - acrylic hybridation | |
| Deionized water | 25.36 |
| Surfactant 25% solution in water | 1.91 |
| Butyl acrylate | 5.16 |
| Butyl methacrylate | 9.07 |
| Methyl methacrylate | 2.67 |
| Ureido methacrylate | 0.89 |
| VAZO 52 | 0.14 |
| Proglyde DMM | 0.71 |
| t-butyl hydroperoxide 70% solution in water | 0.02 |
| Deionized water | 0.91 |
| BRUGGOLITE FF6 | 0.02 |
| Deionized water | 0.91 |

A waterborne jet black basecoat is prepared based on the urethane acrylic hybrid polymer dispersion developed in this invention. A combination of other resins, rheology modifiers with optimized amounts, and different additives including pigment, dispersant, and defoamer were added to adjust the final appearance and performance of the resulting basecoat. For comparison, three commercially available waterborne basecoats were sprayed on P30-SpectraPrime® coated panels.

Micro-TRI-gloss (BYK) is utilized for measuring the gloss at 20°. This instrument combines 20°, 60°, 85° in one glossmeter. In fact, having three geometries in one unit allows to be in compliance with the international standards and to quickly identify quality variations. The results are shown in FIG. 1. As shown, the gloss 20° values were all comparable with each other and there is no significant difference between them.

Figure 2:
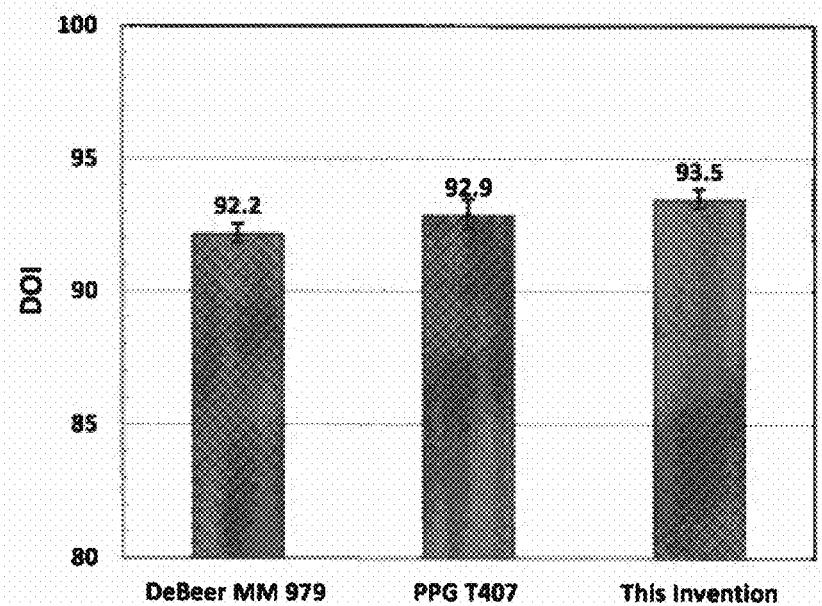
FIG. 2. The distinctness of image (DOI) values for waterborne basecoats tested, including DeBeer MM 979 Basecoat Super Jet Black, PPG T407 Envirobase basecoat Jet Black, and this invention. The values are comparable with each other.

Wave-scan dual (BYK) is used to measure the distinctness of image (DOI) of the samples. In fact, DOI is considered as a quantification of the deviation of direction of light propagation from the regular direction through scattering during reflection or transmission. DOI is very sensitive to scattering effects. In general, the more light is being scattered out of regular direction, the more initially well-defined image is blurred. FIG. 2 shows the DOI values of these samples. Again, no significant difference is observed between the DOI values.

Figure 3:
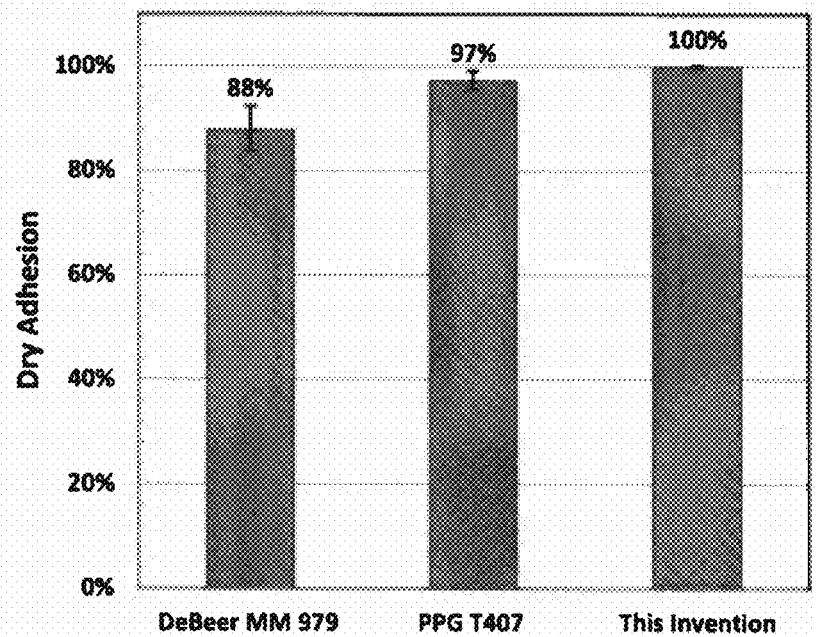
FIG. 3. The dry adhesion test results for waterborne basecoats tested, including DeBeer MM 979 Basecoat Super Jet Black, PPG T407 Envirobase basecoat Jet Black, and this invention. As shown, current invention shows 100% dry adhesion.
Figure 4:
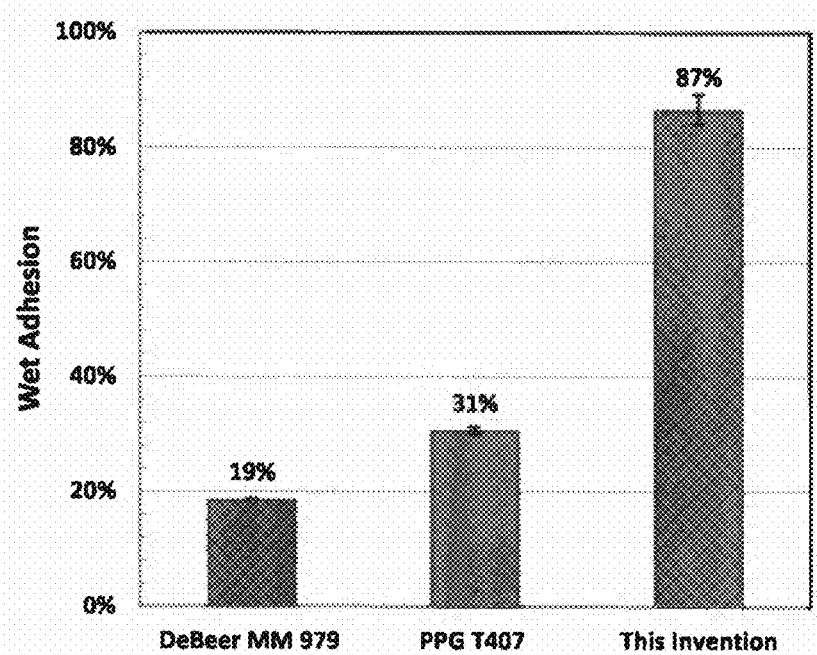
FIG. 4. The wet adhesion test results for waterborne basecoats tested, including DeBeer MM 979 Basecoat Super Jet Black, PPG T407 Envirobase basecoat Jet Black, and this invention. As shown, current invention shows significantly better wet adhesion compared to other formulations.

To measure resistance of these basecoats to separation from the primer, the ISO 2409 test by means of single-blade tool is performed (FIG. 3). In addition, GMW14729 test is used to evaluate wet adhesions and the results are shown in FIG. 4. The test temperature and humidity within the exposure were 38° C.±2° C. and ~100% RH, respectively. The total exposure duration is 96 hours.

What is described above is an example. It is, of course, not possible to describe every conceivable combination of components or procedures, but one of ordinary skill in the art will recognize that many further combinations and permutations are possible. Therefore, the disclosure is intended to embrace all such alterations, modifications, and variations that fall within the scope of this application, including the appended claims.

REFERENCES

1. *Automotive Paints and Coatings*. 2nd ed. 2008: Wiley-VCH.
2. Kukanja, D., et al., *The structure and properties of acrylic-polyurethane hybrid emulsions and comparison with physical blends*. Journal of Applied Polymer Science, 2000. 78(1): p. 67-80.
3. Rink, H. P., et al., *Sulfidgruppen enthaltende Polyurethane und Polymergemische auf dieser Basis sowie ihre Herstellung und ihre Verwendung*. 2002, DE 10053890 A1.
4. Schwarte, S. and E. Wegner, *Polyurethanes and graft copolymers based on polyurethane, and their use for producing coating materials, adhesives, and sealing compounds*. 2004, US20040102595 A1.
5. Haeberle, K. D., *Als Beschichtungsmittel geeignete Polyurethane*. 1995, DE4414032 A1.
6. Ingrisch, S., et al., *Polyurethan-polymer-hybrid-dispersion mit hoher filmhärte, verfahren zu ihrer herstellung sowie deren verwendung*. 2001, EPI 124871 A1.
7. Šebenik, U., J. Golob, and M. Krajnc, *Comparison of properties of acrylic-polyurethane hybrid emulsions prepared by batch and semibatch processes with monomer emulsion feed*. Polymer International, 2003. 52(5): p. 740-748.
8. Dixon, D. D. and F. L. Herman, *Allyl esters of n-alkyl-omega-(alkyleneureido) amic acids and their synthesis and use in aqueous emulsion polymer systems*. 1978, U.S. Pat. No. 4,111,877 A.
9. Welsh, D. A. and R. Dowbenko, *Ethylenically unsaturated ethylene and propylene ureas containing alkylene urea groups or alkylene urethane groups, useful in coating compositions*. 1986, U.S. Pat. No. 4,632,957 A.
10. Dochniak, M J., *Wet adhesion monomers with ureido functionality and polymers prepared therefrom*. 1996, U.S. Pat. No. 5,496,907 A.
11. Sandri, J. M., et al., *Polymerizable compositions comprising derivatives of mono-(alkylene ureido alkyl) ureas and bis-(alkylene ureido alkyl) ureas*. 1984, U.S. Pat. No. 4,429,095 A.
12. Jenkins, R. D., et al., *Latex compositions having wet adhesion and other improved rheological properties and methods of producing same*. 1998, U.S. Pat. No. 5,739,196 A.
13. Pinschmidt, R. K., et al., *Wet adhesion monomer and derived copolymers for latex paints*. 2003, U.S. Pat. No. 6,649,691 B2.

What is claimed is:

1. A urethane acrylic hybrid polymer dispersion, comprising:
   a. a polyurethane dispersion prepolymer comprising (a) at least a polycarbonate diol; and (b) at least one diisocyanate selected from an aliphatic diisocyanate or cycloaliphatic diisocyanate; (c) at least one hydroxy functional carboxylic acid; and (d) optionally one low-molecular-weight polyol, wherein the polyurethane dispersion prepolymer is neutralized by adding tertiary amine; and
   b. an acrylic part having a Tg in the range of −10° to 40° C. and comprising at least one monomer having polymerizable functionality selected from the group consisting of a (meth)acrylate, allyl, and (meth)acrylamide, wherein said monomer contains at least one pendant functional group selected from the group consisting of ureido, amino, morpholino, phosphate, and any combination thereof;
   wherein the urethane acrylic hybrid polymer dispersion is formed by combining the polyurethane dispersion prepolymer and the acrylic part; wherein the acrylic part is present in a range of 10 wt. % to 90 wt. % based on the total weight of the hybrid polymer dispersion, and
   wherein the acrylic part comprises dimethylaminopropyl methacrylamide.

2. The urethane acrylic hybrid polymer dispersion of claim 1, wherein the acrylic part is present in the range from 25 wt. % to 75 wt. %, based on the total weight of the hybrid polymer dispersion.

3. The urethane acrylic hybrid polymer dispersion of claim 1, comprising 0.2 wt. % to 15 wt. % of the at least one monomer having polymerizable functionality, based on the total monomer weight of the acrylic part.

4. The urethane acrylic hybrid polymer dispersion of claim 1, comprising 2.5 wt. % to 7.5 wt. % of the at least one monomer having polymerizable functionality, based on the total monomer weight of the acrylic part.

5. The urethane acrylic hybrid polymer dispersion of claim 1, wherein the polycarbonate diol is prepared from 1,4-butanediol.

6. The urethane acrylic hybrid polymer dispersion of claim 1, wherein the diisocyanate is selected from the group consisting of 1, 6-hexamethylene diisocyanate, tetra-methyl xylylene diisocyanate (TMXDI), isophorone diisocyanate, or dicyclohexylmethane diisocyanate.

7. The urethane acrylic hybrid polymer dispersion of claim 1, wherein the low-molecular-weight polyol has a molecular weight between 60 and 200.

8. The urethane acrylic hybrid polymer dispersion of claim 1, wherein the low-molecular-weight polyol has up to 10 carbon atoms per molecule.

* * * * *